May 17, 1955 H. G. LYKKEN 2,708,654
APPARATUS FOR PRODUCING LIGNITE FUEL PRODUCT
Filed Nov. 1, 1950 2 Sheets-Sheet 1
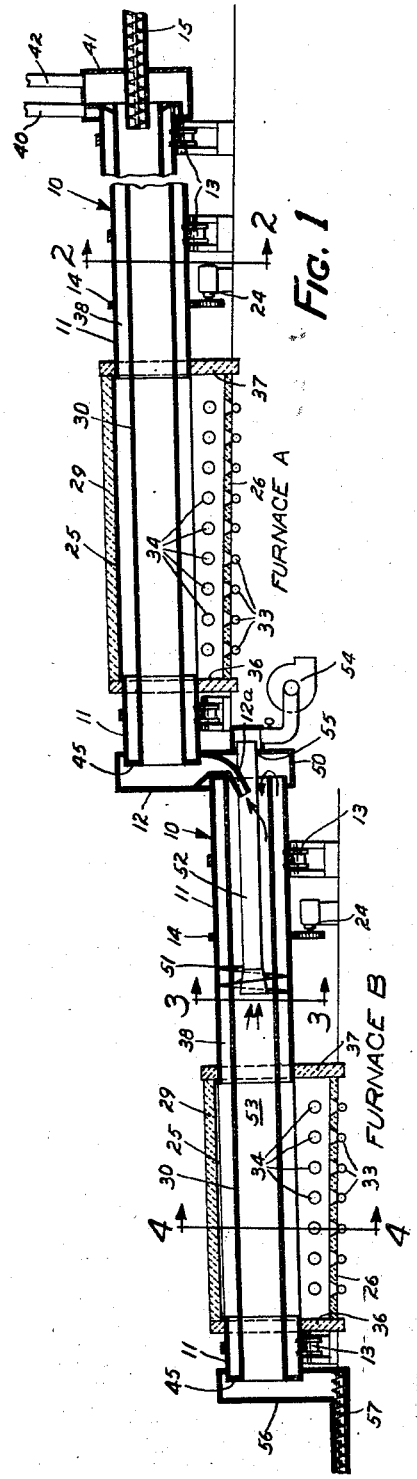
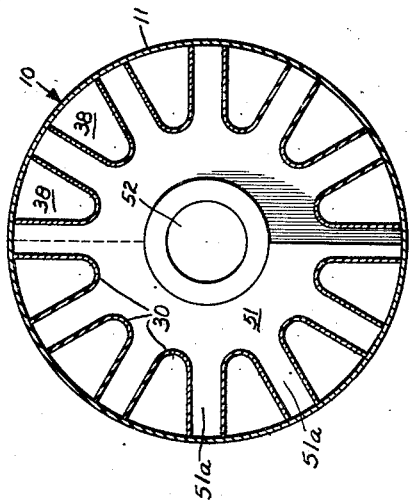
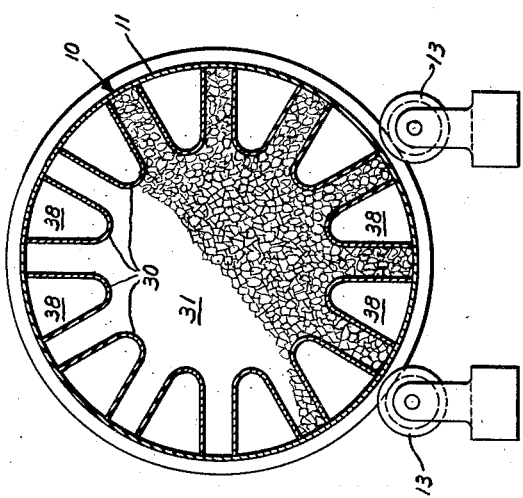
INVENTOR.
HENRY G. LYKKEN
BY
*Paul, Paul & Moore*
ATTORNEYS May 17, 1955     H. G. LYKKEN     2,708,654
APPARATUS FOR PRODUCING LIGNITE FUEL PRODUCT
Filed Nov. 1, 1950     2 Sheets-Sheet 2

INVENTOR.
HENRY G. LYKKEN
BY
ATTORNEYS

United States Patent Office 2,708,654
Patented May 17, 1955

2,708,654

APPARATUS FOR PRODUCING LIGNITE FUEL PRODUCT

Henry G. Lykken, Minneapolis, Minn.

Application November 1, 1950, Serial No. 193,333

7 Claims. (Cl. 202—131)

The present invention relates to an improved apparatus for drying lignite and similar high moisture content lignitic fuels and further relates to the improved fuel thus produced.

The present application is a continuation-in-part of my copending applications Serial No. 52,008, filed September 30, 1948, now Patent No. 2,610,115, and Serial No. 144,804, filed February 17, 1950, now abandoned, which are incorporated herein by reference.

Lignitic fuels contain from 35% to 40% moisture and when allowed to air dry or are dried by mere application of heat, such materials break down and disintegrate into high dust content materials. If any attempt is made to reduce the moisture content below 10 to 15% by ordinary drying, moisture will be reabsorbed. In addition, when so dried, such coals become unstable and are very susceptible to spontaneous ignition during storage. As a consequence the use of lignitic fuels has been limited to those instances in which special precautions are taken to store the material in small quantities or where the material is protected to prevent spontaneous ignition.

The present invention has for its primary object provision of a method and apparatus for producing moisture resisting stable and storable lignitic fuel, wherein the lignite is gradually deprived of its free and combined moisture and rendered more and more activated and adsorptive and dry while simultaneously permitted to absorb and hold mineral hydrocarbon compounds. It is a further object of the present invention to provide a lignitic fuel consisting of hard, dense, dust-free moisture-resistant rounded pellets having a high heat value. A further object of the present invention is to provide lignitic fuel stable and storable without danger of spontaneous combustion.

Other and further objects of the invention are those inherent in the methods and apparatus herein illustrated, described and claimed.

The method and apparatus will be described with particular reference to the drawings in which Figure 1 is a side elevation of the apparatus in section;

Figure 2 is a cross section of Figure 1 taken on the line 2—2;

Figure 3 is a cross section of Figure 1 taken on the line 3—3; and

Throughout the drawings, corresponding numerals refer to the same parts.

Figure 4:
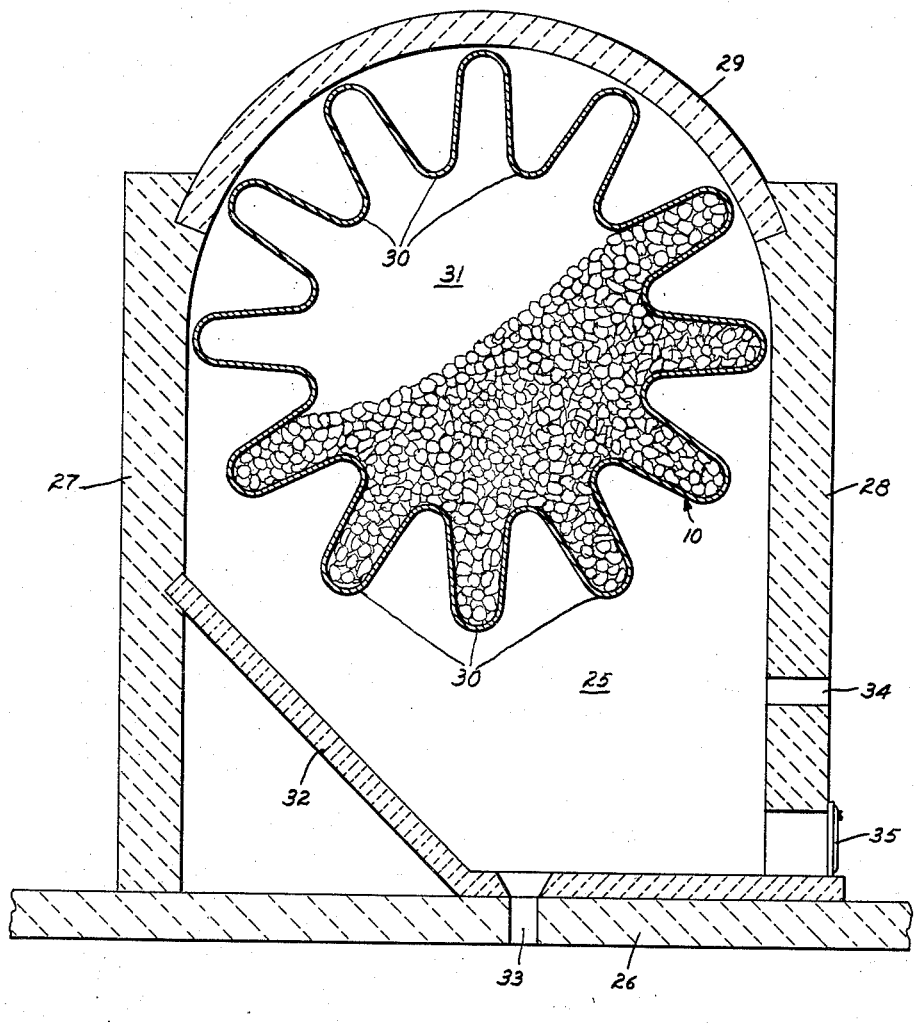
Figure 4 is a cross section taken on the line 4—4 of Figure 1.

In general the process comprises the admixing of a mineral hydrocarbon with the raw lignite charge and the gradual heating of this mixture in a two-stage operation. In the first stage the mixture is gradually heated to an end temperature of about 250 to 260° F., which results in the vaporization of a large part of the free water, if any. The second stage of the operation involves a further heating of the mixture to an end temperature of 500 to 600° although the temperature may be raised as high as 750° F. in some instances. This second stage of heating results in the removal of substantially all the remaining free as well as combined water and some of the hydrocarbon, either by simple distillation or by cracking followed by distillation. A typical two-stage operation may, for example, involve the feeding of a mixture of lignite and hydrocarbon oil at normal temperature, and a moisture content of about 40% and the gradual heating of that mixture to a temperature of 250 to 260° F. at which point the mixture has about 15% moisture. This material is then discharged into the second or processing section and is gradually heated to about 600° F., at which point it is essentially moisture-free.

A raw lignite starting material is crushed so that a predominant part of the feed is of the particle size desired in the finished product. It has been found that a feed which is of a particle size such that all of it passes through a ½-inch screen greatly speeds up the heating and drying effect. It is by no means essential that the entire charge be of a uniform particle size. Indeed, it has been found that when as much as 20% of the total charge is of a particle size of 80 mesh or finer, the fines become a plastic mortar with the hydrocarbon that agglomerate with the larger particles during the processing and firmly adhered thereto upon final discharge at the end of the process.

The hydrocarbons employed for admixture with the lignite may be of a wide variety. Particularly desirable from the cost standpoint are low grade petroleum fractions, such as road oil, tar, asphaltum, bunker oil, pitch and the like, which are liquid at ordinary temperatures or which can be liquefied on slight heating. As will be pointed out more fully hereinafter, it is also possible to employ lighter hydrocarbon materials, such as crude oil, if desired. The mineral hydrocarbon may be applied to the lignite charge by spraying or dripping and is sufficiently mixed with the lignite so as to be relatively uniformly distributed. The mixture of lignite and mineral hydrocarbon is then heated in a treating zone which has walls that are heated to a temperature materially in excess of 250° F. This results in the vaporization of large quantities of water. Some hydrocarbon vapors may be generated in this zone, depending upon the nature of the hydrocarbon feed material. Where low grade petroleum residues are employed, very little, if any hydrocarbon vapors are generated in this portion of the process.

After the lignite has been heated to approximately 250 to 260° F. and has been reduced in moisture content to around 15%, the mixture is discharged into a second heating zone in which the temperature is gradually raised to an end temperature of 500 to 600° F. In this zone large quantities of hydrocarbon gases are given off if crude oil or high volatile hydrocarbons are used. These are withdrawn separately and led to the condenser where they are liquefied. This portion of the process results in the removal of practically all free and combined moisture.

An appreciable amount of the hydrocarbon gases are, however, adsorbed by the lignite after most of the free moisture has been driven off. At this temperature lignite in a superheated steam atmosphere becomes highly activated carbon. In the presence of hydrocarbon gases in the superheated steam, particularly the lighter fraction or fixed gases are adsorbed, neutralizing this activating effect, thus providing a stable condition not only in the processing but a stable end product as well.

This is a main feature of the invention based on the discovery that as the carbon is progressively activated by heating in the presence of superheated steam, it is progressively saturated or deactivated by the lighter hydrocarbons present in the steam. Lignite dried to 300° F. is taken to be water-free. As the temperature is increased, a molecular breakdown takes place liberating additional water and $CO_2$. In this manner most, if not all, of the organically bound oxygen is eliminated. The B. T. U. value of the product is measurably increased. It leaves, however, open molecular bond and a highly unstable product that can be and is stabilized, saturated or deactivated by the hydrocarbons as provided for in the invention.

The unvaporized hydrocarbon residuum forms a film on the larger particles and a plastic mortar with fines and dust that adheres to the larger particles and serves as a binder in a pelletizing or briquetting process.

The temperatures of 500 to 750° F., preferably 500 to 600° F., in this zone are high enough to effect some cracking of the mineral hydrocarbons in contact with the lignitic material which apparently acts to some extent as a cracking catalyst. The extent to which cracking is carried on may be regulated by the temperature employed and accordingly it will be appreciated that the quantity of mineral hydrocarbon to be fed to the process originally is dependent not only upon the quantity of relatively volatile materials therein but also upon the temperature employed in the final portion of the process which does effect some cracking.

Furthermore, the quantity of hydrocarbon to be employed is dependent upon the quantity that it is desired to maintain in the finished product. In general, it has been found desirable to maintain a minimum residual oil content of about 3½%. Higher residual oil contents of 4½ to 5% produce denser, harder pellets having a more glossy surface. Larger quantities of residual oil may be employed up to 10 percent and more, thereby increasing the B. T. U. content of the product. The quantity of oil employed is dictated by the availability of a suitable material at a satisfactory price, but usually should not be materially less than that which will provide about 3½% residual hydrocarbons in the finished product.

Referring to the drawings, particularly Figure 1, there is illustrated a pair of tube furnaces which are of generally the same construction, having minor differences which will be pointed out hereinafter. For ease of description these furnaces will be referred to as furnace A and furnace B, respectively, the first furnace in the processing line being furnace A. Like numerals will be used to refer to identical parts in the two furnaces and the points of variation will be described with reference to each furnace.

The furnaces are composed of an inclined tube generally designated 10 which is the chamber through which the lignite is passed from a feeding screw or other feeding device 15, which feeds the mixture of lignite and hydrocarbon from a hopper or bin not shown. The material passes through the tubular furnace and is discharged into hopper 12. Tube 10 is composed of a plurality of outwardly extending folds or convolutions 30 which extend from end to end of the tube. The convolutions or folds 30 form inwardly extending pockets or channels and are joined together as shown in Figures 2 and 4 and they also form a central open space 31. The extended interior and exterior surface of the convolutions 30 greatly facilitate heat transfer.

The tube furnace is surrounded by an exterior tube 11 which is supported upon an inclined axis by means of a plurality of roller mountings 13 and the tube is arranged to be rotated in its mountings by means of a bull gear 14 driven by a suitable gear motor or other variable speed driving arrangement 24. Rotation of the tube is very slow and the rate of rotation can be varied.

Disposed near the lower portion of each furnace is a heating chamber 25 which is shown in cross section in Figure 4. The heating chamber is composed of a base member 26 and side members 27 and 28. An arched roof 29 encloses the top of the heating chamber. The rear of the heating chamber has an inclined wall 32 which conducts the ash of the fuel employed for heating to a series of discharge openings 33 located in the bottom of the heating chamber. These discharge openings are preferably connected to some source of reduced pressure such that the ash is sucked out of the furnace. The front wall of the furnace has a series of openings 34 for the introduction of the fuel employed for combustion which preferably is pulverized lignite. This pulverized lignite is blown into the furnace together with a requisite quantity of air or other oxygen-containing gas for ignition. A clean-out door 35 is provided near the base of the front wall.

The section of the tubular furnace which is enclosed within the heating chamber is somewhat different in construction from the remainder of the tubular furnace. As shown in Figure 4, the convolutions or folds 30 are exposed on the outside to the atmosphere within the heating chamber. There is no tube 11 surrounding the convolutions at this portion of the tubular furnace. The tube 11 again surrounds the convolutions at the very end portion of the tubular furnace.

The heating chamber is provided with end walls 36 and 37 which surround the tube 11 at the ends of the heating chamber and these end walls serve to confine the combustion gases and to lead them into the spaces between the convolutions 30. These spaces are indicated as 38 in Figure 2. The products of combustion pass along the convolutions 30 through the spaces 38 and serve to heat the material contained within the tubular furnace by heat transfer through the walls of the convolutions 30. At the feed end of the inclined end of the furnace A these products of combustion are segregated and are discharged through flue 40. The moisture vapors and any hydrocarbon vapors liberated from the lignite in furnace A are segregated by the housing 41 surrounding the feed end of the furnace A and are taken off through flue 42 from which they may be led into a condenser if it is found desirable to condense the hydrocarbon vapor for recovery.

The spaces 38 at the extreme lower end of each furnace are sealed off by plates 45 shown in cross section in Figure 1. Thus, it is not possible for the products of combustion of the heating chamber being discharged into the vapors or gases which are in actual contact with the lignite material being treated.

The lignitic material discharged from furnace A into hopper 12 is introduced into furnace B, having a curved chute 12A reaching into space 31 of furnace B and through which the solid charge from furnace A is delivered into the upper end of space 31 of furnace B and through which the gaseous products from space 31 of furnace B pass up through hopper 12 to space 31 of furnace A. Furnace B is similar to furnace A except that the gaseous products of combustion which pass up through spaces 38 are discharged into breaching 50 which is in communication with hopper 12 through the discharge spout of hopper 12. These products of combustion are therewith mixed with the gaseous products liberated from the lignite in the first section of furnace B. Furnace B, however, differs from furnace A in the provision of a sealing screw 51 which surrounds a duct 52 which serves to conduct gases liberated in space 53 to the blower 54. The gases liberated in space 53 where the lignite is heated to an elevated temperature contain appreciable quantities of hydrocarbon gases either as a result of direct distillation or as a result of a combination of cracking and distillation. These gases are withdrawn by blower 54 and may be introduced into a condenser for the recovery of the hydrocarbon. The seal 51 which is illustrated in Figures 1 and 3 is a helical screw member which is attached to and surrounds the duct 52 and extends out through the spaces 51a—51a between convolutions 30—30. However, sealing screw 51 does not close spaces 38—38 and gases from the furnace space 25 of furnace B pass through spaces 38—38 to breaching 50 whence they continue through the interior space 31 of furnace A. In this manner screw seal 51 acts somewhat as a screw conveyor progressing the lignite from one side of the seal to the other and preventing the free communication of gases from one side of the seal to the other. The tube 52 is supported on one end by the screw seal 51 and is rotatably supported at 55, the point at which it passes through the back wall of the breaching 50 and thence to exhaust fan 54. Fan 54 sucks the gases from space 53 of furnace B, through tube 52 through the fan 54, such gases being thus separately pulled off.

At the lower end of furnace B the lignite is discharged into a hopper 56 which is sealed from the atmosphere by means of discharge screw 57 which is driven by a motor not shown. The discharge screw 57 is maintained with a sufficient quantity of lignitic product therein to seal the discharge end of the furnace from direct contact with the air.

Any suitable apparatus is used for crushing and sizing the crushed lignite. Mineral hydrocarbon is then applied by spraying or dripping the above stated amount and the lignite-hydrocarbon mixture is then fed into the elevated end of the tube by means of the feed screw which passes through the housing 41. The lignite thus discharged into the interior of the tube 10 flows into the deep pockets formed by convolutions 30 where it is heated by contact with the exterior hot shell forming the pockets. The initial reaction is the generation of steam by the heat which gradually penetrates into the particles and volatilizes the natural moisture. Steam emanating from the particles themselves flows into contact with the much hotter interior surface of the pockets formed by convolutions 30 and becomes superheated. The superheated steam then in turn transfers heat to other particles which may not be in direct contact with the shell. As the tube 10 is rotated the finished lignite product is gradually discharged from the uppermost pockets and into the interior space 31 and from it gently rolls into the lower pockets. Thus, the lignite is rolled over and over on itself and is driven into the pockets formed by convolutions 30 and subsequently discharged therefrom. As a result the heat flow into the particles is very efficient. It may be noted that lignite-mineral hydrocarbon mixture has very favorable rolling and flowing characteristics and resists abrasion and dust formation. Any dust that is formed is held by the hydrocarbon and thus saved. The steam which is volatilized as a result of the heating passes through the interior space 31 and through the area of the uppermost and unloaded pockets in the tube 10 and migrates to the upper end of the tube and then is discharged into the flue 42 where it escapes. The lignite meanwhile gradually migrates down the tube 10 and discharges into the discharge hopper 12 from which it is conducted into the second furnace B.

The rate of rotation of the tube 10 and the inclination thereof are adjusted so that for a given particle size of lignite the rate of heat penetration into the particle will be such that the interior of practically all of the particles will be heated to approximately 250 to 260° F. by the time the lignite particle has traveled through the tube and reached the lowermost end of the tube. With most hydrocarbon feed materials employed, relatively little material will be volatilized at these temperatures.

In furnace B the action which occurs is similar to that which occurs in furnace A except that it is carried on to a higher temperature. In furnace B the lignite is gradually heated to more elevated temperatures and this results in a removal of much, if not all, of the so-called combined water of the lignite. This water is principally removed as vapor before the lignite passes the screw-seal 51, and the water vapor is passed out through breaching 50 and thence through furnace A and discharged along with the moisture vapor liberated therein. In furnace B beyond (below) seal 51 the lignite is heated to much higher temperatures and this results in the material vaporization of and cracking of some of the hydrocarbon oil. The hydrocarbon vapors and any residual moisture which is vaporized are withdrawn through tube 52 and fan 54 and are condensed and recovered. The high temperature to which the lignite is heated in furnace B serves somewhat to plasticize the surface of the lignite particles such that they will pick up fine particles of lignite which may have been broken off from the lignite feed material and these fines are thus agglomerated with the larger particles to produce a product which is relatively free from fines.

It is possible by this process to produce lignite pellets having hard, smooth, dense surfaces. For this purpose it is desirable to have the lignite particles at the very last stage of furnace B tumble repeatedly onto a hard surface. To accomplish this result it has been found desirable to eliminate the convolutions 30 from the final section of furnace B and to employ an interior of the furnace which is smooth and free from convolutions. In this way the lignite is subject to rolling action which serves to round up the corners and edges and to convert the lignite pellets into hard, smooth pellets with a very fine, dense surface. If it is not desired to produce lignite pellets of such a smooth contour the final section of furnace B may be the same as the remaining portions of the furnace, in which case the lignite is not subjected to appreciable pelletizing action and a product having somewhat sharper edges and corners will be obtained.

For industrial furnaces coarser lignite with less fines can be processed with a minimum of hydrocarbon and the final product which may or may not be pelletized by using a final smooth section in furnace B is then shipped finished after cooling. For domestic use it is preferable to use the smooth pelletizing section in furnace B as indicated above, or the product may be passed through an independently driven and operated smooth tubular pelletizing kiln. For another form of domestic use, the product is processed in a standard briquetting press.

The present invention is particularly adapted for the production of three existing types of fuel. (1) Industrial fuel for the spreader stoker grate or pulverizer containing from 3½% to 4½% of residual oil; (2) domestic fuel with hard, clean and dust-free pellets adapted to the domestic stoker and grates containing from 4½% to 5½% residual oil; and (3) domestic fuel as hard as clean briquettes containing from 6% to 8% residual oil as binder. In the production of these briquettes a somewhat larger quantity of residual hydrocarbon is employed, and the product which is discharged from furnace B is merely cooled somewhat and then may be briquetted directly for domestic fuel while hot without the addition of any further binder.

Many apparently widely different embodiments of the invention may be made without departing from the spirit and scope thereof. For example, the processing furnace may be a continuous tube or structure, as shown in my application Serial No. 52,008 and Serial No. 144,804 above identified, rather than divided into two sections, as shown in Figure 1 hereof, where only heavy residuum oil is used with comparatively little volatile hydrocarbon escaping with the exit vapor, or where ample water is present so as to permit economical condensation of all of the vapors. The sectional kiln is called for only where crude petroleum and lighter fraction hydrocarbon are used, or when a large quantity of distillate has to be recovered, such as when oil cracking and distillation is combined with the beneficiation of the lignite. It is to be understood that I do not limit myself to the specific embodiments herein.

What I claim is:

1. Apparatus for treating lignite which comprises in series a first rotary furnace and a second rotary furnace;

jackets surrounding each of said furnaces for the indirect heating of said furnaces by means of gaseous products of combustion; sealing means positioned intermediate of the ends of the second rotary furnace separating the interior of the second furnace into two distinct heating zones: a first heating zone and a second heating zone; means for introducing a solid material into the first furnace; means for separately withdrawing the vapors liberated in the first furnace and the gaseous products of combustion from the jacket; means for collecting the material discharged from the first furnace and for conducting it into the first heating zone of the second furnace; and means for withdrawing the vapors from the second heating zone of the second furnace separate from the vapors formed in the first heating zone of said furnace.

2. A rotary furnace comprising an inner convoluted tubular member and an outer shell surrounding the inner tubular member and adapted to contain a heating medium for heating the inner tubular member, a tubular vapor withdrawal duct extending from a point intermediate the ends of the furnace and extending to one end of the furnace, a helical screw extending around the vapor withdrawal duct and attached thereto, said helical screw being attached at its outer edge to the inner tubular member, whereby communication from one side of the helical screw to the other is possible only around the threads of the screw.

3. An apparatus according to claim 2 in which fan means are provided for withdrawal of vapors from within the inner tubular member beyond said helical screw through the vapor discharge duct.

4. An apparatus according to claim 2 in which the discharge end of the furnace is surrounded by a housing and screw discharge means are provided for discharging material from the housing.

5. A lignite treating furnace comprising an inclined tube, means mounting the tube for rotation about its longitudinal axis, means for introducing crushed lignitic coal into the upper end of the tube and for withdrawing the treated lignitic coal from the lower end of the tube, said introducing and withdrawal means being sealed against the escape of gases therethrough, means for indirectly heating the upper end of the tube sufficiently to partially heat the lignitic coal and means for indirectly heating the lower portion of said tube sufficiently to increase the temperature of lignitic material in the tube to a final higher temperature, a vapor withdrawal duct extending into the tube and terminating at an interior end intermediate the ends of said tube, screw seal means around the duct, between the duct and said tube adjacent the interior end of said duct, and a breaching at one end of the tube connected in sealed relation to the duct for withdrawing from the interior of the tube and through the duct the vapors generated from the lignite during its heating while passing through the tube.

6. A rotary kiln for treating lignitic coal, said kiln being of tubular construction and having its outer surface deeply corrugated longitudinally so as to provide longitudinally extending corrugation grooves on the interior of the tube and extending substantially lengthwise thereof, a jacket around a portion of said tube, means for supporting the tube for rotation about its longitudinal axis with said jacket at an elevated position and the tube mounted along an inclined axis, a furnace enclosure around a lower portion of the tube not enclosed by said jacket, said tube being sealed with respect to said furnace for passage of furnace gases exteriorly of the tube and thence lengthwise along the exterior thereof but within said jacket, a first breaching means connected with the space between said jacket and said tube and a second breaching means connected to the interior tube space, both breaching means being at the upper end of the tube and screw conveyor means for introducing lignitic coal into the interior of said tube at the upper end thereof for passage downwardly therethrough, and a hopper connected in sealed relation to the lower end of the tube for collecting solid material passed through said tube.

7. A two-stage rotary furnace for processing lignitic coal comprising two inclined tubular rotary furnaces, each having a heating jacket therearound for indirectly heating the interior of said furnaces, said furnaces each being mounted in an inclined position one above the other with the lower end of the upper connected with the upper end of the lower, a gas withdrawal tube mounted coaxially within the lower tubular furnace and extending along the upper portion thereof, a screw having several turns surrounding said gas withdrawal tube and connecting it with said tubular furnace wall, said screw being positioned about midway between the ends of the lower tubular furnace for sealing the space between the gas withdrawal tube and the tubular furnace against passage of gases while permitting the passage of solids therethrough, means for withdrawing vapors from the lower portion of the lower tubular furnace through said gas withdrawal tube and for withdrawing vapors from the upper portion of the lower tubular furnace through the connection with the upper tubular furnace and thence through said upper tubular furnace, means for introducing solid lignitic material to be treated into the upper end of the upper tubular furnace and for withdrawing the finished product from the lower end of the lower tubular furnace, each of said means being sealed against the passage of the vapors or gases therethrough.

References Cited in the file of this patent

UNITED STATES PATENTS

| | | |
|---|---|---|
| 1,219,155 | Rigby | Mar. 13, 1917 |
| 1,369,611 | Bosch | Feb. 22, 1921 |
| 1,495,573 | Cantieny | May 27, 1924 |
| 1,738,826 | Harty et al. | Dec. 10, 1929 |
| 1,819,102 | Kuppers | Aug. 18, 1931 |
| 1,976,816 | Vandegrift | Oct. 16, 1934 |
| 1,074,881 | Witting | Mar. 23, 1937 |
| 2,122,037 | Lissauer | June 28, 1938 |
| 2,323,289 | Anderson et al. | July 6, 1943 |
| 2,400,935 | Kent | May 28, 1946 |
| 2,500,553 | Lykken | Mar. 14, 1950 |